June 9, 1959 A. D. EHRENFRIED 2,889,989

APPARATUS FOR COMPLEX PLANE COMPUTATIONS

Filed April 14, 1953 4 Sheets-Sheet 1

Inventor
Albert D. Ehrenfried
By Alois W. Graf
Attorney

June 9, 1959 A. D. EHRENFRIED 2,889,989

APPARATUS FOR COMPLEX PLANE COMPUTATIONS

Filed April 14, 1953 4 Sheets-Sheet 2

Inventor
Albert D. Ehrenfried
By Alois W. Graf
attorney

June 9, 1959 A. D. EHRENFRIED 2,889,989

APPARATUS FOR COMPLEX PLANE COMPUTATIONS

Filed April 14, 1953 4 Sheets-Sheet 3

Inventor
Albert D. Ehrenfried
By Alois W. Graf Attorney

June 9, 1959 A. D. EHRENFRIED 2,889,989

APPARATUS FOR COMPLEX PLANE COMPUTATIONS

Filed April 14, 1953 4 Sheets-Sheet 4

Vector composition of S, (S+ω_d) and (S+ζω_n+jω_d) - terms in the S Plane

Inventor
Albert D. Ehrenfried
By Alois W. Graf
Attorney 2,889,989
Patented June 9, 1959

2,889,989

APPARATUS FOR COMPLEX PLANE COMPUTATIONS

Albert D. Ehrenfried, Bedford, Mass., assignor, by mesne assignments, to Acton Laboratories, Inc., Acton, Mass.

Application April 14, 1953, Serial No. 348,719

11 Claims. (Cl. 235—189)

The present invention relates to a computing instrument and more particularly to an instrument for the rapid and accurate multiplication of vectors on the complex frequency plane.

Within recent years the complex $s$ or $p$ frequency plane has been employed in synthesizing closed-chain control systems from a knowledge of open-chain component performance. The terms closed-chain and open-chain are now being used in preference to closed-loop and open-loop formerly used, so as to avoid the incongruity of the term open-loop. The Root Locus method is a graphical procedure for locating the roots of closed-chain equations on the complex frequency plane. Once the poles and zeros of an open- or closed-chain system are logged, the transient and sinusoidal system responses can be determined.

All of these complex plane operations, the evaluation of transient and sinusoidal response and the application of the Root Locus method, require the composition of complex vectors of the first order forms $s$, $(s+a)$ and $(s+a\pm jw)$. These vectors can be composed graphically on the $s$-plane from the root positions $-a$ and $(-a\mp jw)$ and the general complex vector $s$.

After being composed, these complex vectors must be multiplied and divided to form the open- and closed-chain performance expressions, and the residue expressions which lead to the transient behavior. As with many graphical methods of analysis, the procedure of complex vector addition and multiplication on the $s$-plane is straightforward but is tedious and inaccurate if some form of graphical computer is not available.

A number of physical schemes are possible for performing the required vector additions and multiplications. One of these methods may be termed the "string vector method." This involves physically setting up the $s$-plane on which the open-chain poles and zeros are represented by string guides. From a movable exploratory $s$-point a separate string is run to each of these guides, and each of these strings represent the vectors which must be multiplied together. If an angle reading device is placed on each string, the total angle of the pole vectors can be subtracted from the total angle of the zero vectors, and the 180° angle condition can be sought directly. Each of the vector strings can also be attached to a logarithmic potentiometer which produces a log voltage proportional to the log-length of each string vector. The sum of the log-lengths of the zero vectors minus the sum of the log-lengths of the pole vectors determines the log-magnitude of the resultant vector by means of logarithmic addition instead of linear multiplication.

The string vector apparatus appears to present numerous difficulties. A system handling a total of ten or more poles and zeros would become crowded with strings and angle measuring devices, thus making free motion of the exploratory $s$-point difficult.

Another method which achieves mechanical simplicity at the cost of considerable electrical equipment utilizes synchro servo-mechanisms to represent the root vectors electrically. In such case the $s$-plane would be set up physically with an exploratory $s$-point free to move about the plane. Electric voltages representing the exploratory s-vector could be added to the root vector voltages and the resultant vectors then multiplied in electrical form. When the 180° angle condition is met, a point recording device at the exploratory $s$-point could be actuated as described previously.

Still another approach to this solution is the use of an electrostatic field analogue. This employs the electrostatic trough apparatus which has certain inconveniences, and in some of the applications transformation is required to the complex logarithmic plane.

It, therefore, becomes apparent that in view of the difficulties of the possible complex vector apparatus described it would be desirable to have a simple low-cost instrument which could be used on a desk or table to perform the required vector manipulations. While such equipment would not permit tracking the Root Locus, the speed and operating convenience of a simplified instrument together with greater accuracy would be highly desirable. While previously described apparatus or systems measure the angles and log-magnitudes of ten or more vectors simultaneously it is proposed to employ a single vector measuring system together with a memory system to store the angles and log-magnitudes of about ten vectors as they are measured separately. Such apparatus could have a storage system which would not physically obstruct the $s$-plane, and furthermore there would not be the congestion of the $s$-plane by a complex network of strings. However, many operations such as the evaluation of open- and closed-chain sinusoidal responses and the calculation of residues could be performed directly with such single apparatus.

In accordance with the present invention it is proposed to provide a relatively simple arrangement employing a mechanical vector measuring unit which can be located on the complex plane plot to produce electrical quantities representative of the vector angle and magnitude for each vector, together with an electric circuit and suitable controls for storing successive vector informations, which subsequently are multiplied electrically and the resultant vector indicated by an electrical meter. The vectors are measured by a retractable steel tape to produce a voltage directly proportional to the logarithm of the complex vector length. When the tape is turned angularly a linear voltage precisely proportional to the vector angle is produced. Both length and angle voltages are stored in an electric circuit.

It, therefore, is an object of the present invention to provide a new and improved device for the rapid multiplication and division of vectors.

A further object of the invention is to provide an improved calculating device for the multiplication of complex vectors in polar form.

A still further object of the invention is to provide a system and means for introducing into an electric calculating apparatus electrical quantities representative of a vector angle and its magnitude.

Still another object of the invention is to provide improved means for translating the vector quantity into a linear magnitude and into a log-magnitude for purposes of multiplication.

Still another object of the invention is to provide an improved calculating apparatus employing a system having an ultrahigh impedance circuit.

A still further object of the invention is to provide in a measuring system an ultrahigh impedance measuring circuit having an arrangement for zero suppression.

A further object of the invention is to provide in an ultrahigh impedance measuring circuit constant absolute accuracy for a plurality of ranges of measurement.

Still another object of the invention is to provide a novel arrangement of capacitors for individual selection and charging in accordance with desired electrical quantities.

A still further object of the invention is to provide in an ultrahigh impedance measuring circuit for the magnification of a selected portion of the meter scale.

A still further object of the invention is to provide a single ultrahigh impedance electrometer stage for indicating the charge or voltage, on one or more capacitors with a minimum discharge thereof.

Still another object of the invention is to provide for the single calibration of a measuring apparatus having several electrical circuits or means which are to be controlled in accordance with quantities to be indicated or measured.

Still another object of the invention is to provide a measuring device for a plurality of vectors measured one at a time for subsequent multiplication or calculation.

A still further object of the invention is to provide an improved means for translating linear and angular quantities into electrical quantities.

Other and further objects of the invention subsequently will become apparent by reference to the following description taken in conjunction with the accompanying drawings, wherein.

Figure 1:
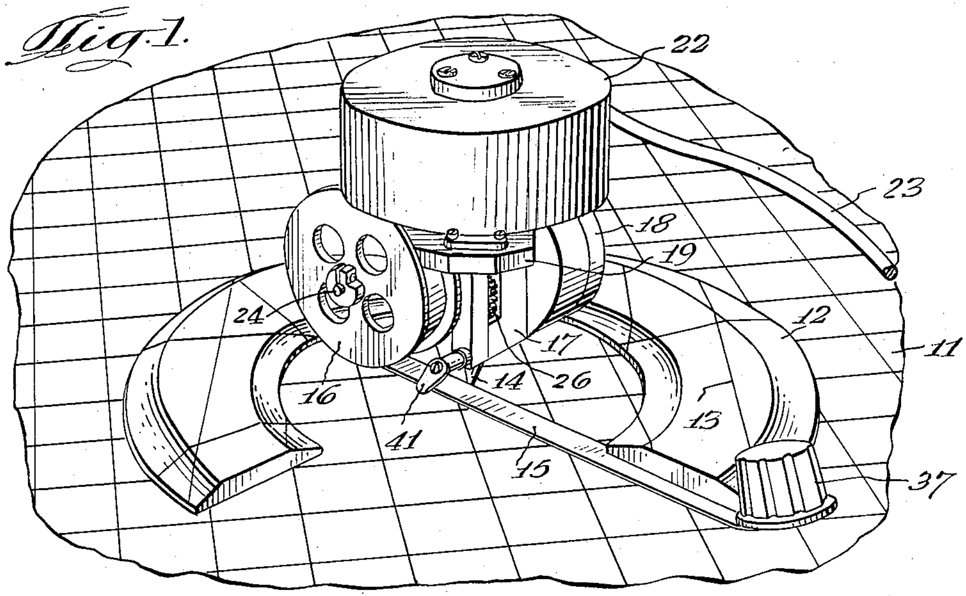
Figure 1 is a perspective view of a manually actuated translating apparatus for converting mechanical values into electrical values which forms a part of the present invention.

In Figure 1 there is shown a horizontal surface 11 arranged with suitable coordinates for plotting thereon certain mathematical values as vectors. Placed upon the horizontal surface 11 is a support 12 of transparent material on which suitable guide lines 13 may be scribed. The apparatus has a reference point indicator 14 along the side of which is located a retractable tape 15 which is carried by a reel 16. The reel 16 is connected through a gear box 17 to a potentiometer 18 so that changes in the length of the tape 15 are translated into suitable electrical quantities by potentiometer 18. A horizontal support 19 carried by a vertical member 21, shown in Figures 2 and 4, supports another potentiometer 22 having a shaft in coaxial alignment with the reference point 14. The shaft of the potentiometer 22 is actuated by angular displacement of the tape 15 as subsequently will become apparent. The electrical outputs of the potentiometers 18 and 22 are connected through a suitable cable 23 to an electric circuit subsequently to be described.

Figure 2:
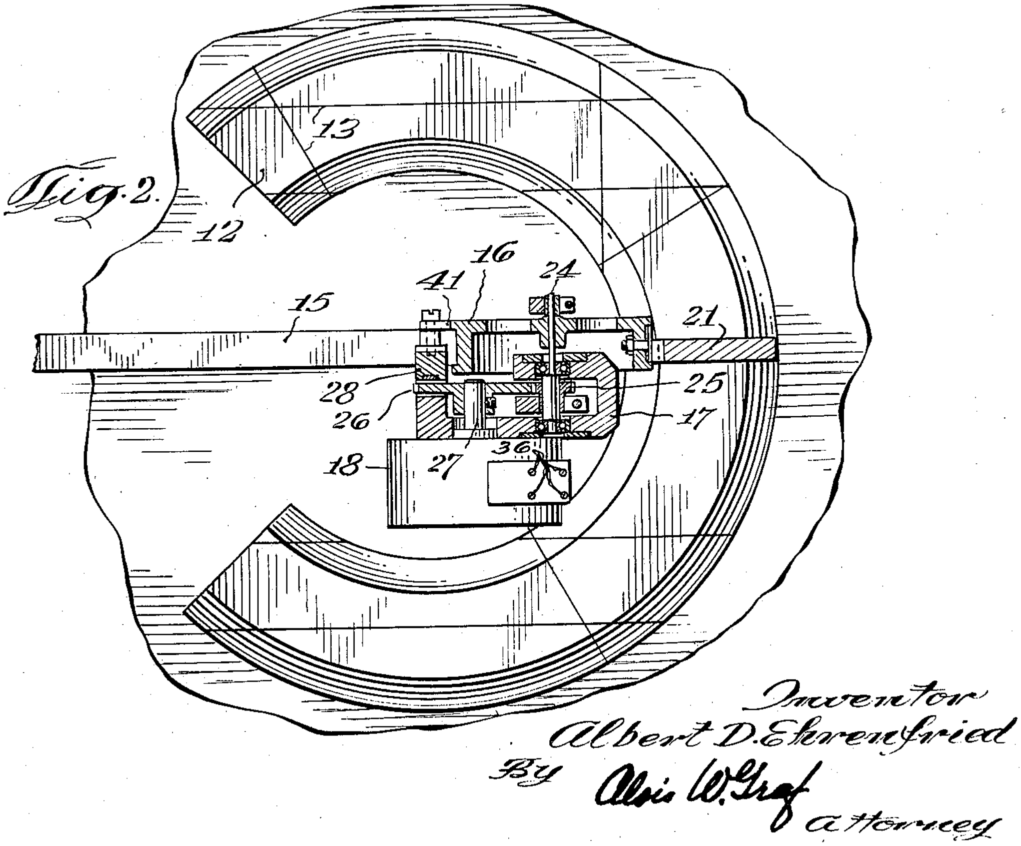
Figure 2 is a plan view of the apparatus shown in Figure 1 with portions thereof in cross section as seen in the direction of the arrows along the line 2—2 of Figure 4.
Figure 3:
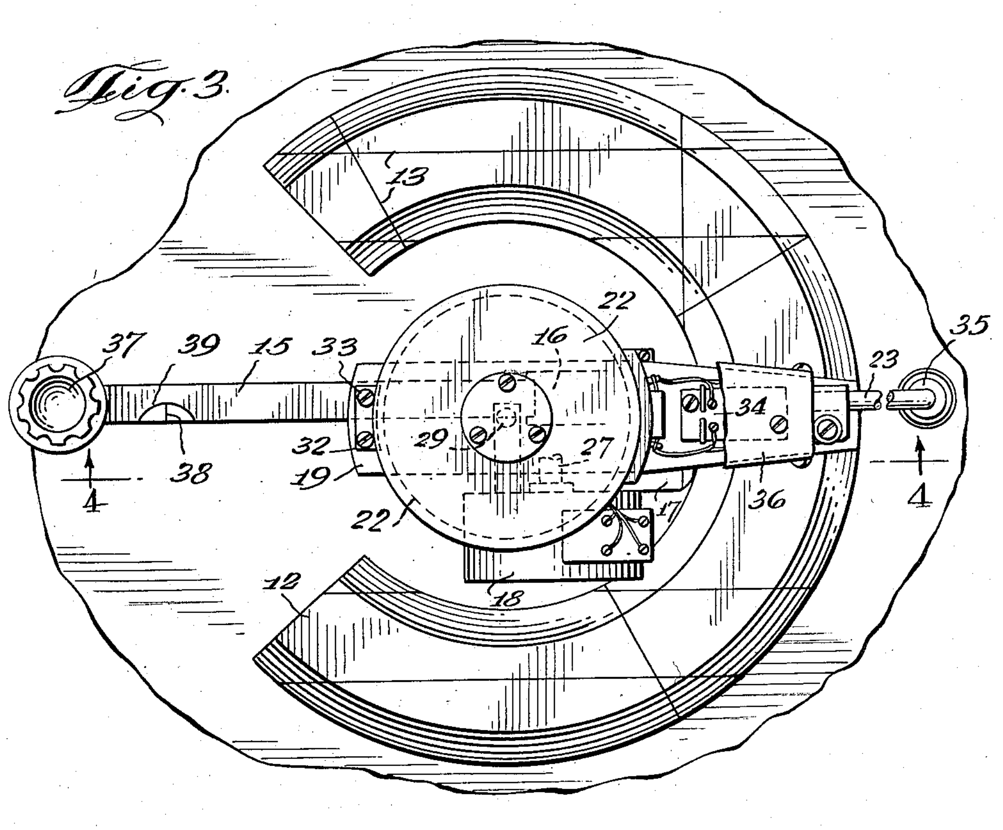
Figure 3 is a plan view of the apparatus shown in Figure 1.
Figure 4:
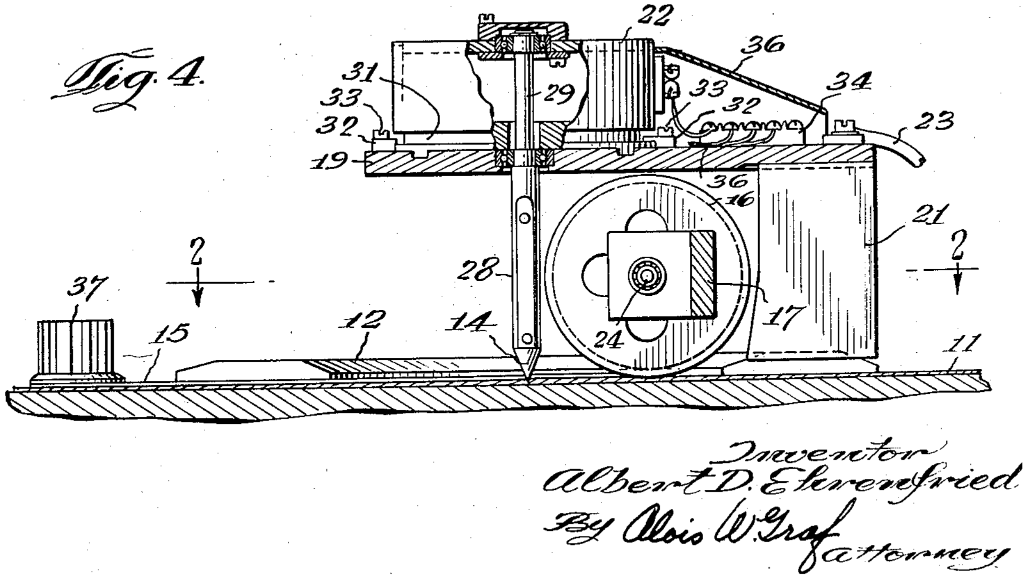
Figure 4 is a side view of the apparatus of Figure 1 with portions thereof in cross section as seen in the direction of the arrows along the line 4—4 of Figure 3.

The details of the manually actuated translating apparatus shown in Figure 1 for converting mechanical values into electrical values are shown in Figures 2, 3 and 4. It will be seen from Figure 2 that the tape 15 is to be wound on a reel 16 which is connected to a shaft 24 having one end passing into the gear box 17. A suitable gear mounted on the end of shaft 24 within the gear box 17 engages a gear 25 which in turn drives a gear 26 connected to a shaft 27 which is the shaft of the potentiometer 18. The gear box 17 is connected through a tongue and groove connection to the upper portion 28 of the reference point 14 so that when the tape 15 is moved through an angle the upper portion 28 of the reference point 14 likewise will be moved through an angle.

The manner in which the shaft of the potentiometer 22 is actuated by angular displacement of the tape 15 will be apparent from a consideration of Figures 3 and 4. The potentiometer 22 has an actuating shaft 29 which is connected to or formed integrally with the enlarged portion 28 of the reference point 14. The case of the potentiometer 22 is provided with a groove 31 so that suitable retaining brackets 32 secured by screws 33 hold the case of the potentiometer 22 on the horizontal support 19. The electrical connections from the potentiometer 22 lead to a terminal block 34 which in turn is connected to the output cable 23 which may be provided with a suitable electrical plug 35 for connection to the electrical circuit subsequently to be described. Electrical connections 36 from the potentiometer 18 also lead to the terminal block 34. The terminal block 34 and the terminals of the potentiometer 22 may be protected by a suitable cover 36. It will be noted that the tape 15 is provided with a suitable knob 37 so that it is readily actuated. A short distance from the knob 37 there is provided a reference line 38 which in the preferred form comprises a line marked on a transparent semi-circular insert 39. In order that the tape 15 may be kept adjacent the reference point 14 there is provided a suitable guide structure 41 which is better seen in Figures 1 and 2. For the purposes of the present invention the potentiometer 22 has a linear resistance winding while the potentiometer 18 has a logarithmic resistance winding. Thus angular changes of the tape 15 are translated into linear electrical quantities, whereas displacement longitudinally of the tape 15 produces the logarithmic equivalent of the linear displacement.

Figure 5:
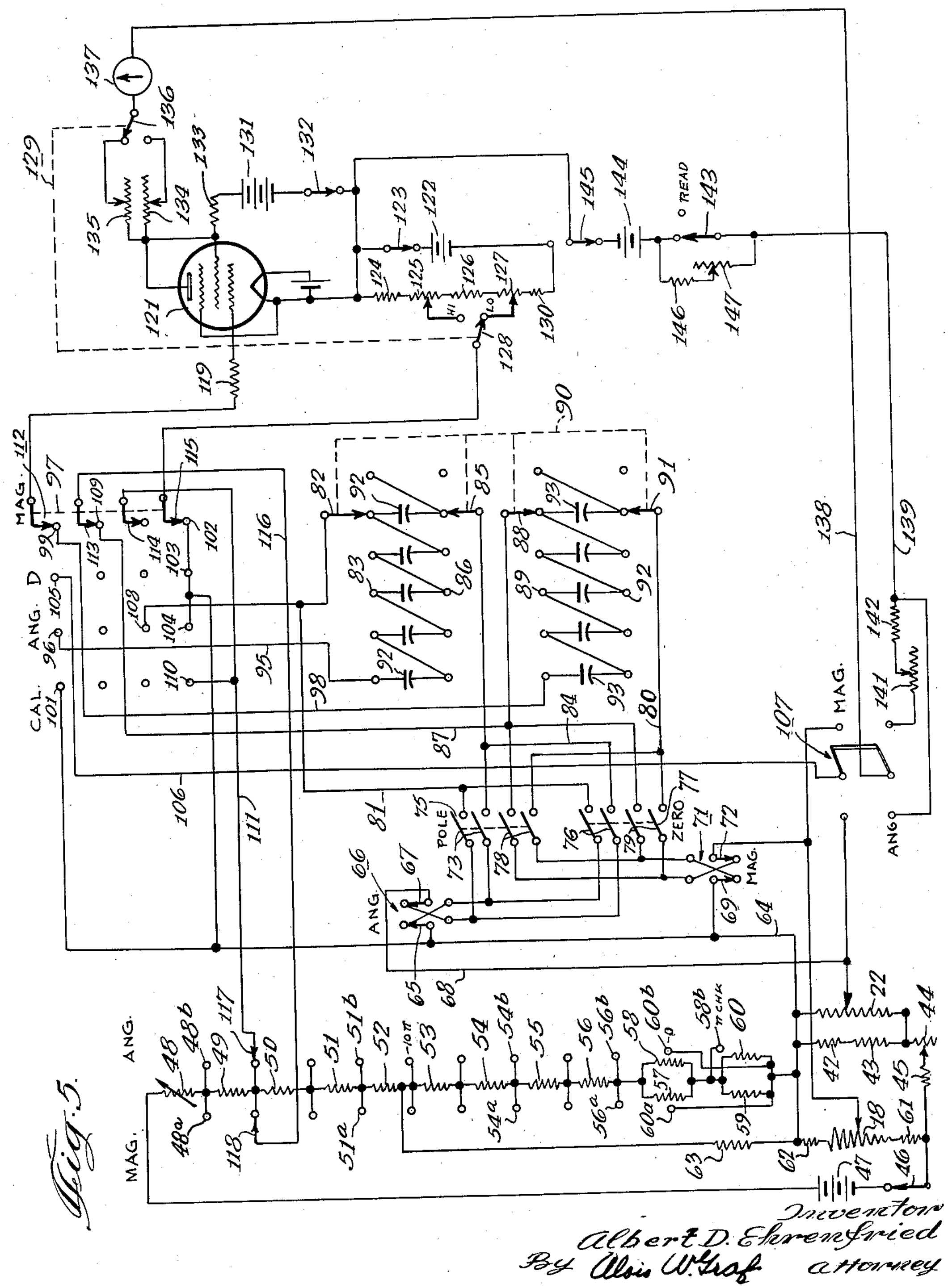
Figure 5 is a circuit diagram of the system comprising the present invention.

Figure 5 shows the electric circuit diagram of a system for receiving the electrical values from the translating apparatus shown in Figures 1 to 4. Thus from the lower left hand corner of the diagram it may be noted that there has been indicated the logarithmic potentiometer 18 and the linear potentiometer 22. In order to obtain the desired value of the linear potentiometer 22 there was provided a shunt circuit formed of several series resistors 42 and 43. One end of potentiometer 22 is connected to an adjustable resistor 44 having its movable contact connected through a series resistor 45 which in turn is connected to an electric switch 46. Electric switch 46 is connected to one terminal of a suitable source of potential such as a battery 47 having its other terminal connected to a circuit including an adjustable resistor 48 and a plurality of series connected resistors 49 through 56 which in turn were connected in series with two parallel resistors 57 and 58 which in turn were connected in series to two parallel resistors 59 and 60 whose common juncture was connected to the other terminal of the potentiometer 22.

The logarithmic potentiometer 18 has one terminal connected to a resistor 61 which is connected to the switch 46. The other terminal of the potentiometer 18 is connected to a resistor 62 having one terminal connected to the common juncture between the resistors 59 and 60 and also to another resistor 63 having one terminal connected to the common juncture between the resistors 52 and 53. The common juncture between the resistors 59 and 60, which is connected to one terminal of the resistor 62 and the potentiometer 22, is connected to a conductor 64. The conductor 64 is connected to one pole 65 of a double pole double throw reversing switch 66 which has its other pole 67 connected to a conductor 68 leading to the movable contact of the resistance winding of the potentiometer 22. The conductor 64 is also connected to one pole 69 of a double pole double throw switch 71 having its other pole 72 connected to the adjustable contact or wiper arm of the logarithmic potentiometer 18.

The terminals of reversing switch 66 are connected to two blades 73 of a four pole single throw switch 75 bearing the notation "pole," and also to two blades 76 of another four pole single throw switch 77 bearing the notation "zero." The remaining poles or blades 78 of the switch 75 and the remaining blades 79 of the switch 77 are connected to the reversing switch 71.

The upper contact of the switch blades 73 and 76 of the switches 75 and 77 are connected to a conductor 81 which is connected to a switch arm 82 of a multi-position switch having a plurality of contacts 83 cooperating therewith. The lower terminals of the switch blades 73 and 76 of the switches 75 and 77 are connected to a conductor 84 which is connected to a switch arm 85 cooperating with a plurality of switch contacts 86.

The upper contacts of the pair of switch blades 78 and 79 of the switches 75 and 77 are connected to a conductor 87 which is connected to a switch arm 88 for cooperation with a plurality of switch contacts 89. The lower contacts of the switch blades 78 and 79 are likewise connected to the conductor 80 which leads to a switch arm 91 arranged for cooperation with a plurality of contacts 92. It will be noted that the switch arms 82, 85, 88 and 91 are arranged for simultaneous operation, and hence comprise a four pole multi-position switch assembly 90. Between the switch contacts 83 and 86 there are arranged a plurality of series connected capacitors 92 so that movement of the switch arms 82 and 85 across the various contacts 83 and 86 may select any particular capacitor 92. It will be noted that the last two contacts 83 and 86 are not connected to any capacitor, only the last contact 83 being connected to one terminal of the previous capacitor 92.

In a similar manner a plurality of capacitors 93 is connected between the respective terminals 89 and 92 so that the two switch arms 88 and 91 may be connected to any selected capacitor 93. The last contact 92 is not connected to any capacitor so that the last contact 88 is connected to the opposite terminal of the preceding capacitor 93.

It will be noted that the first capacitor 92 is connected to a conductor 95 which leads to a contact 96 of a four pole four position switch 97. The capacitor 93 is connected to a conductor 98 which leads to a switch contact 99 of the switch 97. The switch 97 has four contacts 101, 102, 103, and 104 connected to the conductor 64. A contact 105 is connected to a conductor 106 which is connected to one pole of a double pole double throw switch 107. The switch blade connected to the conductor 106 is adapted to be thrown to make contact with the contact arm of the linear potentiometer 22 when thrown to the left, and to the contact arm of the logarithmic potentiometer 18 when thrown to the right.

Another contact 108 of the switch 97 is connected to the conductor 81 which leads to the switch blade 82 of the switch 90. The conductor 87 is connected to the contact 109 of the switch 97. Another contact 110 is connected to a conductor 111 which is connected to the switch blade 114 of the switch 97. The switch blade 113 of the switch 97 is connected to a conductor 116. It will be noted that the switch blade 112 is arranged for selective engagement with the contacts 96, 99, 101 and 105. The switch blade 113 is arranged for selective engagement with the switch contact 109 and the other three positions of the switch blade 113 do not make any electrical connection. The switch blade 114 makes connection with contact 108 in the third position of the switch. The switch blade 115 makes contact with contacts 102, 103 and 104 in the first three positions of the switch which are all connected to the conductor 64. In the last position of the switch 97 the switch blade 115 makes contact with the contact 110 which is connected to the conductor 111. The conductor 111 is connected to a switch arm 117 while the conductor 116 is connected to a switch arm 118. The switch arms 117 and 118 are arranged to contact the switch contacts *48b* et seq. and *48a* et seq. respectively. It will be noted that the various switch contacts have been given reference characters corresponding to the resistor immediately preceding the contacts as seen from the top of the circuit diagram of Figure 5.

The switch arm 112 of the switch 97 is connected through a suitable grid resistor 119 to an electrometer tube 121. The cathode of the electrometer tube 121 is connected to a biasing circuit which includes a source of potential 122 which is connected by a switch 123 across a circuit comprising a fixed resistor 124, a potentiometer 125, a fixed resistor 126, a potentiometer 127 and a fixed resistor 130. The adjustable contacts of the potentiometers 125 and 126 are connected to electrical contacts for cooperation with one pole or switch blade 128 of a switch 129 having its other switch blade 136 connected in the anode circuit of the electrometer tube 121. The switch arm 128 is connected to the switch arm 115 of the electric switch 97. A suitable source of anode potential 131 is arranged to be connected through a switch 132 to the cathode of the vacuum tube 121. The other terminal of the source of potential 131 is connected through a suitable resistor 133 to the screen grid and the anode of the vacuum tube 121. The anode of the vacuum tube 121 is connected to two anode resistors 134 and 135 provided with adjustable contacts connected to a pair of switch contacts cooperating with the switch arm 136 of the switch 129. The switch arm 136 is connected to a suitable indicating meter 137 which is connected by a conductor 138 to one switch blade of the double pole double throw switch 107. One terminal or contact for cooperation with the switch blade of the switch 107 connected to the conductor 138 is directly connected to a conductor 139, whereas the other contact is connected through an adjustable resistor 141 and a fixed resistor 142 to the conductor 139. The conductor 139 is arranged to be connected through a switch 143 directly to a source of potential 144 which in turn is connected through a switch 145 to the cathode of electrometer tube 121. In parallel with the switch 143 is a circuit comprising a series resistor 146 and an adjustable resistor 147 so that when the switch 143 is open the resistors 146 and 147 are in series between the source of potential 144 and the conductor 139.

The circuit shown in Figure 5 performs the functions of translating mechanical values into calibrated linear and logarithmic voltage inputs, storing and summing these inputs, and finally indicating or measuring accurately the resultant total angle and magnitude voltages. In the application of the circuit arrangement shown in Figure 5 with the translating apparatus shown in Figure 1 the linear potentiometer 22 provides a linear direct current voltage output from zero to −2.5 volts for angles ranging from zero to substantially 360°. The voltages obtained from the potentiometer 22 are supplied to charge the angle storage capacitors 92.

The logarithmic potentiometer 18 by movement of the tape 15 translates the magnitude of a vector into a direct current log-magnitude voltage. The potentiometer 18, therefore, produces the logarithmic vector magnitudes from 2.5 to 160 units, which in one embodiment had a linear scale factor where one inch equals ten units. The voltage scale factor of the logarithmic potentiometer is −2.5 volts per decade for the magnitude system. Since the capacitors 92 and 93 are mounted for selection by the switch 90 at any particular setting, those selected capacitors can be charged to voltages proportional to the angle and the log-magnitude of any measured or selected vector.

When all the vectors which are to be multiplied have been stored in the capacitors 92 and 93 the selector switch 90 is advanced one more position. The capacitors are wired or connected in series so that the total voltage of either capacitor bank appears between the upper movable contact 82 or 88 and the conductors 95 and 98 respectively. Thus there are stored in the respective banks of capacitors two summation voltages, one representing a resultant angle and another representing a resultant log-magnitude, which then may be supplied to the circuit associated with the vacuum tube 121 to produce an indication on the meter 137.

The meter 137 must provide a reading of the angle from zero to 360°, and further must provide a determination of angles to within 1° in the region of 180° for Root Locus purposes. The circuit arrangement is such that it is capable of handling angle summations totalling over 3600°. The meter 137 will give full scale deflection for a 2½ volt swing in the electrometer grid circuit. In order to place the summation voltages of the series capacitors within the 2½ volt range, a set of precision metering taps is provided to subtract intervals of 2½ volts from the summation voltages until the remaining difference is less than 2½ volts. This is accomplished by the resistor arrangement including the resistors 49 through 60 and the switch arms 117 and 118. The metering taps provided for selection by the switch arms 117 and 118 therefore, produce a suppressed zero indication on the indicating meter 137 so that the indication for any value has a constant absolute accuracy. The manner in which this is accomplished will further be described in greater detail.

Figure 6:
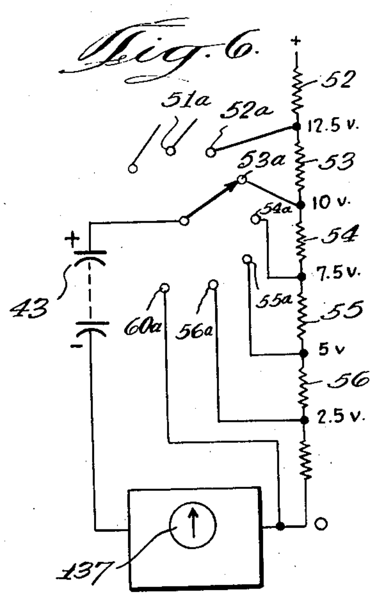
Figures 6 and 7 are circuit diagrams explanatory of certain portions of the circuit shown in Figure 5.

Figure 6 of the drawing shows a simplification of the circuit shown in Figure 5 wherein corresponding components have been given similar reference characters. It now may be assumed that it is desired to obtain the resultant of the voltages stored on the log-magnitude capacitors 93. It further may be assumed that the total voltage exceeds 10 volts, but is less than 12½ volts. In such case the switch arm 118 will be moved to the contact **53*a*, whereupon the meter 137 will produce an indication within its scale. The reading of the meter would be added to 10 volts in order to determine the resultant of the summation voltages of the series capacitors 93**.

A similar arrangement was provided for reading the summation of the voltages corresponding to the log-magnitudes stored on the capacitors 92. In this case it will be assumed that the voltage appearing on the series capacitors 92 is greater than 7½ volts, but less than 10 volts, whereupon the selector switch 117 would be advanced to the contact **54*b***.

Figure 7:
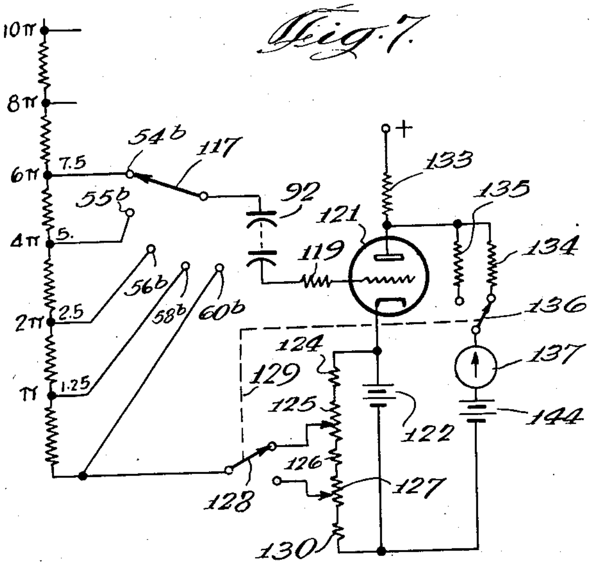

The circuit arrangement shown in Figure 7 in simplified form illustrates certain operations of the electrometer circuit. It was previously stated that two levels of precision are required for indication between the meter 137. A relatively high degree of precision is required for seeking the $\pi$ condition where the sensitivity of the instrument should be five times greater than the required sensitivity for evaluating the system performance. The necessity for having the greater sensitivity on the determination of the $\pi$ condition is that for many pole-zero configurations a sizeable error in locating the 180° angle condition can cause significant change in the contour of the Root Locus on the *s*-plane. In one embodiment the meter 137 had a scale of about four inches in length which gave a full reading from zero to 360°. The 180° angle condition is to be read on the same meter scale, and hence an arrangement is provided for increasing the meter sensitivity five fold in the region of the mid scale or indication. In the vicinity of the 180° indication an expanded indication of the scale is provided in order to determine the deviations from 180° to within a fraction of 1°. The switch blades 128 and 136 would be in the position shown in Figure 2, but in Figure 7 they are shown in the high sensitivity position. The resistance in series with the meter 134 is changed by the operation of the switch blade 136 of the switch 129. Increased sensitivity is accomplished by reducing the series protective resistor in the meter circuit by a factor of approximately 5. Such action alone, however, would cause the meter needle to be driven off scale. Hence at the same time that the switch blade 136 changed the value of the resistor in series with the meter 137 the other switch blade 128 changes the value of the biasing voltage applied to the grid of the electrometer tube 121. The effect produced is illustrated graphically in Figure 8. In that figure it will be noted that full scale deflection is obtained by a current of 50 microamps, and that mid scale deflection would be obtained by 25 microamps. Under normal operation the effective voltage on the grid for mid scale deflection would be −3 volts. A few tenths of a volt change of the grid voltage would not produce appreciable change in the indication of the meter as is apparent from the curve A. Where, however, the bias voltage has been changed to the curve B, a much higher sensitivity is obtained so that a relatively small change or difference in the effective voltage on the grid of the tube 121 produces a much greater current change through the tube 121. It of course will be appreciated that this system of producing magnification of the meter reading at mid scale could be provided for sensitivity magnification in other regions of the meter.

In order to calibrate the electrometer employing the tube 121 it must be possible to adjust the electrometer circuit so as to place a zero signal precisely at the meter zero scale and to place the high and low $\pi$ readings precisely at mid scale. In order to provide accurate computation it further is necessary to establish the correct potential gradients in the linear and logarithmic potentiometers 22 and 18 respectively and to provide for suppressing the resultant voltages of the storage capacitors 92 and 93 by precisely 2½ volts. In order to minimize the adjustments necessary for accomplishing these results a single adjustable resistor 49 is shown in Figure 5 as being in series with a source of potential 47. To accomplish a single setting calibration, the logarithmic potentiometer 18 is connected in parallel with the linear potentiometer 22, and a precision shunt circuit employing the resistors 42, 43 and 44 determines exactly the correct current for the logarithmic potentiometer 18. With the potentiometers and the shunt circuit so located it is possible to have any two metering taps such as **54*a* and 55*a* exactly equal to 2½ volts. In checking this relation for the resistors 49 through 60 a switch arm 117 is connected to the contact 60*b* with the bias switch 128 in the low position. The contact on the resistor 127 is then adjusted so that the meter 137 reads precisely zero degrees. For the second calibration reading called the "low $\pi$ set" the switch arm 117 is placed on the contact 58*b* and the adjustable resistor 48 is adjusted so that the meter needle will be precisely at mid scale. The accuracy of this setting can be checked by moving the switch arm 117 to contact 56*b* which then should produce full scale deflections. The final step of calibration is the "high $\pi$ set" where the switch arm 117 is on contact 58*b*, the previous low $\pi$ set and zero set adjustments having been made. The metering circuit is switched to the high sensitivity by actuating the switch 129, and the grid bias setting is determined by adjustment of the contact on the resistor 125** to bring the meter needle to mid scale. It should now be possible to switch back and forth to mid scale without any perceptible movement of the meter needle from mid scale position.

The circuit of Figure 5 has shown five capacitors 92 and five capacitors 93, although in the actual initial embodiment of the circuit in an apparatus ten such capacitors were provided. It is therefore apparent that the particular number of capacitors is of no significance other than the larger the number the greater number of vectors may be stored for summation. Each of the capacitors is charged through two of the switch blades of the switch 90 by setting the selector switch in any one of the positions for which capacitors have been shown, and an angle capacitor and a log-magnitude capacitor are joined to the output terminals of the two switches 75 and 77. The switches 75 and 77 are actuated in accordance with the graphical representation of the vector as to whether the vector is a pole vector or a zero vector. As each vector is measured the selector switch 90 is advanced one position until all of the capacitors have been charged or until all of the vectors have been measured, if the number to be measured is less than the number of capacitors available. The switch 90 is then advanced one more position so that the storage of the voltages of the capacitors 92 and 93 might be determined by operation of the switch 112. Where it is desired to determine the resultant of the magnitude capacitors 93 the switch blades of the switch 112 are in the position shown in Figure 5. Where it is desired to obtain an indication of the angle capacitors the switch blades of the switch 112 are moved to the contacts 96, 108 and 104. It will be noted that the switch 112 also has another position which is known as the calibrating position when the switch blades engage the contacts 101 and 110. A fourth position D is available for directly measuring the direct angle and log-magnitude of any particular vector.

It will be noted in Figure 5 that the switch 143 is shown in the closed position which is the position of the switch when a reading is to be taken on the meter when it has been determined that the reading will fall within the scale of the meter. Prior thereto the switch 143 is normally open and the meter is protected by the resistor circuit including the resistors 146 and 147. It was previously stated that the switch 127 had a position indicated as position D. This position is available for checking performance of the instrument, and for reading such parameters as damped radian frequency, natural radian frequency and the reciprocal of the characteristic time directly from the $s$-plane plot. When the switch 107 has been thrown to the angle position, a suitable scale on the meter 137 may be used to read the damping ratio of any quadratic pair.

It is believed that other details of the manipulations of the switches for various operations will readily be apparent to those skilled in the art, and that any physical embodiment of an apparatus in accordance with the teachings of the present invention would be accompanied with suitable detailed instructions for the operation, which however is not believed to constitute any part of the present invention. Only sufficient portions of the mode of operation have been given in order to give an indication of the various components and the manner of the operation of the system shown in Figure 5.

Figures 8, 9:
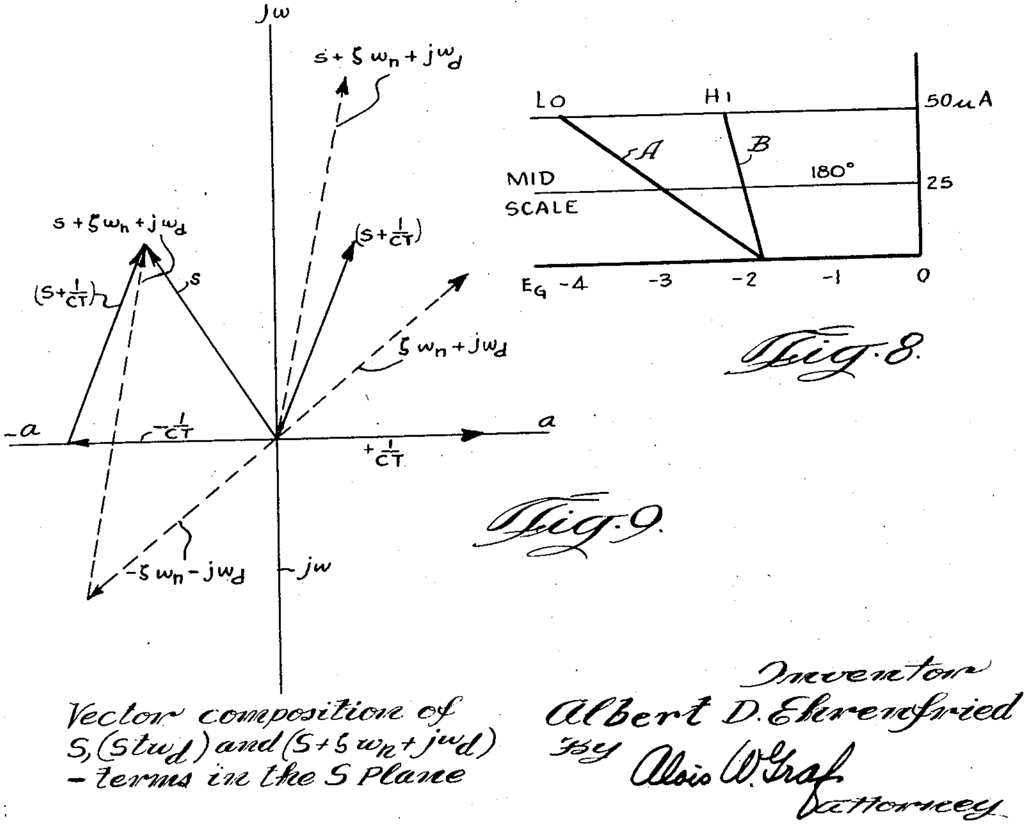
Figure 8 is a graph illustrating certain operations or characteristics of the circuit of Figure 7.
Figure 9 is a vector diagram illustrating the application of the present invention to the solution of a problem.

It is further assumed that those skilled in the art are sufficiently familiar with the graphical aspects of the Root Locus method that no detailed dissertation on the translation of complex vector relations into the $s$-plane or complex plane are here in order. To briefly indicate, however, the manner in which the present apparatus may be employed there has been shown in Figure 9 certain vector compositions in terms of the $s$-plane. In that representation the complex $s$-vector is an "exploratory" vector which may have any desired position. In the Root Locus technique, the open-chain performance function is evaluated graphically for various assumed functions of the complex variable $s$. Where vectors have been plotted as indicated in Figure 9 the translating mechanism shown in Figure 1 may have its reference point 14 appropriately positioned, whereupon the tape 15 may be extended to measure any of the vectors and to obtain the resultant of the vectors measured. The utility of applicant's apparatus will be appreciated because of the simplicity with which solutions can be obtained by use of the present invention.

While for the purpose of illustrating and describing the present invention certain preferred embodiments have been shown in the drawings, it is to be understood that the invention is not to be limited thereby since such variations in the circuit arrangement and in the components employed are contemplated as may be commensurate with the spirit and scope of the invention as defined in the appending claims.

I claim as my invention:

1. An electrical instrument for performing vector analyses in the complex frequency plane comprising, in combination, an input device having first and second mutually intercoupled means for generating voltages representative of a plurality of vector magnitudes and angles, respectively, means for discretely storing each of said magnitude and angle voltages, an indicating circuit, means for coupling said indicating circuit to said storing means for independently displaying values respectively related to the summation of the stored magnitude and angle voltages, and means associated with said input device and in circuit with said voltage generating means for calibrating said indicating circuit.

2. An electrical instrument for performing vector analyses in the complex frequency plane comprising, in combination, an input device having first and second mechanically intercoupled potentiometers, input means for setting said potentiometers as a function of vector magnitudes and angles, respectively, a plurality of capacitors, a potential source, an input voltage divider including said potentiometers and energized from said potential source, switching means selectively operable for discretely storing in said capacitors voltages derived from said potentiometers for each vector magnitude and angle setting thereof, an indicating device, means for independently and serially coupling said capacitors storing magnitude and angle voltages to said indicating device, switching means coupling said indicating device to said voltage divider for calibration with reference to said potential source and said potentiometers.

3. A complex frequency plane analyzer in accordance with claim 2, wherein said first and second potentiometers are affixed to a support adapted to be placed on a generally horizontal surface, and including an electrical cable for coupling each of said potentiometers to said voltage divider and said capacitor switching means.

4. A complex frequency plane analyzer in accordance with claim 2 and including, a support for said potentiometers adapted to be placed on a generally horizontal surface, said support, a reference point marker for said support, a retractable tape arranged to actuate said first and second potentiometers in predetermined proportion to the linear extension and to the angular orientation thereof, respectively, and an electrical cable for coupling each of said potentiometers to said voltage divider and said capacitor switching means.

5. A complex frequency plane analyzer in accordance with claim 4, wherein said first potentiometer provides an output voltage proportional to the logarithm of said linear extension while said second potentiometer provides an output voltage linearly proportional to said angle setting.

6. A complex frequency plane analyzer in accordance with claim 5 wherein said indicating device comprises an ultra-high resistance electrometer circuit adapted to measure said serially connected capacitor voltages substantially without redistribution of the charges thereon.

7. A complex frequency plane analyzer in accordance with claim 6 and including an input circuit for said electrometer whereby said serial capacitor voltage being measured may be opposed by a predetermined voltage derived from said voltage divider, the difference being readable on said electrometer.

8. A complex frequency plane analyzer in accordance with claim 6 and including switching means for coupling said potentiometers to said electrometer circuit independently of said storage means, whereby vector magnitude and angles represented by said tape may be directly displayed upon said indicating device.

9. A complex frequency plane analyzer in accordance with claim 6 wherein said electrometer circuit comprises a vacuum tube and an indicating meter connected in the anode circuit thereof, a source of negative bias potential for said tube, and circuit means for selectively changing the anode load and the effective grid bias to vary the sensitivity of said meter at an intermediate scale portion.

10. A complex frequency plane analyzer in accordance with claim 6 and including means associated with said input voltage divider for obtaining voltage increments each equal to the voltage range of said indicating device, and switching means for selectively connecting to said indicating device sufficient increments of said voltage whereby the difference between said increments and the capacitor voltage to be measured falls within the scale of said indicating device.

11. An electrical instrument for performing vector analyses in the complex frequency plane comprising, in combination, an input device having first and second mutually intercoupled means for generating voltages representative of a plurality of vector magnitudes and angles, respectively, means for discretely storing each of said magnitude and angle voltages, an indicating circuit, and means for coupling said indicating circuit to said storing means for independently displaying values respectively related to the summation of the stored magnitude and angle voltages.

References Cited in the file of this patent

UNITED STATES PATENTS

| | | |
|---|---|---|
| 2,208,329 | Morelock | July 16, 1940 |
| 2,349,437 | Keeler | May 23, 1944 |
| 2,385,334 | Davey | Sept. 25, 1945 |
| 2,401,447 | Wipff | June 4, 1946 |
| 2,452,539 | Baecher | Nov. 2, 1948 |
| 2,471,393 | Caldwell et al. | May 24, 1949 |
| 2,497,961 | Shaw | Feb. 21, 1950 |
| 2,518,332 | Keegan et al. | Aug. 8, 1950 |
| 2,535,942 | Lewis et al. | Dec. 26, 1950 |
| 2,540,310 | Wolf | Feb. 6, 1951 |
| 2,547,105 | Williams | Apr. 3, 1951 |
| 2,622,798 | Aughtie | Dec. 22, 1952 |
| 2,736,861 | Duffy et al. | Feb. 28, 1956 |